(12) United States Patent
Wessling et al.

(10) Patent No.: US 10,802,177 B2
(45) Date of Patent: Oct. 13, 2020

(54) EVALUATING HYDROCARBON RESERVES USING TOOL RESPONSE MODELS

(71) Applicants: Stefan Wessling, Saxony (DE); Nicklas Ritzmann, Saxony (DE)

(72) Inventors: Stefan Wessling, Saxony (DE); Nicklas Ritzmann, Saxony (DE)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 355 days.

(21) Appl. No.: 15/784,795

(22) Filed: Oct. 16, 2017

(65) Prior Publication Data

US 2019/0113653 A1   Apr. 18, 2019

(51) Int. Cl.
*G01V 99/00* (2009.01)
*E21B 47/10* (2012.01)

(52) U.S. Cl.
CPC ............ *G01V 99/005* (2013.01); *E21B 47/10* (2013.01); *G01V 2210/6122* (2013.01); *G01V 2210/66* (2013.01)

(58) Field of Classification Search
None
See application file for complete search history.

(56) References Cited

U.S. PATENT DOCUMENTS 3,895,520 A * 7/1975 Fertl ..................... E21B 49/00
73/152.06
4,765,182 A   8/1988 Boone 5,862,513 A   1/1999 Mezzatesta et al.
7,340,384 B2  3/2008 Delhomme et al.
8,714,246 B2  5/2014 Pop et al.
9,223,056 B2  12/2015 Wu et al.
(Continued)

FOREIGN PATENT DOCUMENTS

WO   2015187151 A1   12/2015
WO   2016093842 A1   6/2016

OTHER PUBLICATIONS

Ijasan et al., "Inversion-based petrophysical interpretation of logging-while-drilling nuclear and resistivity measurements," Geophysics, vol. 78, No. 6, Nov.-Dec. 2013, pp. D473-D489.
(Continued)

*Primary Examiner* — Gregory J Toatley, Jr.
*Assistant Examiner* — Terence E Stifter, Jr.
(74) *Attorney, Agent, or Firm* — Cantor Colburn LLP

(57) ABSTRACT

Techniques for evaluating hydrocarbon reserves using tool response models are provided. An example method includes measuring a first fluid distribution of a first formation proximate to a first wellbore and measuring a second fluid distribution of a second formation proximate to a second wellbore. The method further includes generating a first tool response model for the first formation based at least in part on the first fluid distribution and generating a second tool response model for the second formation based at least in part on the second fluid distribution. The method further includes comparing results of the first tool response model to results of the second tool response model to determine a fluid distribution difference between the first formation and the second formation and implementing a drilling command to alter drilling of one of the first and second wellbores based at least in part on the fluid distribution difference.

12 Claims, 5 Drawing Sheets

(56) References Cited

U.S. PATENT DOCUMENTS

| | | |
|---|---|---|
| 9,411,915 B2 | 8/2016 | Bouzarkouna et al. |
| 9,703,006 B2 | 7/2017 | Stern et al. |
| 2005/0263691 A1 | 12/2005 | Guo |
| 2014/0379265 A1 | 12/2014 | Beda et al. |
| 2016/0168985 A1* | 6/2016 | Betancourt-Pocaterra ............... E21B 49/005 73/152.04 |
| 2016/0215607 A1 | 7/2016 | Lemons et al. |
| 2017/0123104 A1 | 5/2017 | Donadille et al. |

OTHER PUBLICATIONS

Prensky, "A Review of Gas Hydrates and Formation Evaluation of Hydrate-Bearing Reservoirs," Abstract, 1995 SPWLA 36th Annual Logging Symposium Transactions, paper GGG, 13 pgs. http://www.sprensky.com/publishd/hydrates.html.

ProQuest Dialog, NewsRx, "IPF Energies Nouvelles," Patent Issued for Method of Selecting Positions of Wells to be Drilled for Petroleum Reservoir Development (USPTO 9411915), Journal of Engineering, Aug. 22, 2016, 4 pgs.

International Search Report and Written Opinion dated Feb. 27, 2019 cited in Application No. PCT/US2018/055533, 11 pgs.

\* cited by examiner

EVALUATING HYDROCARBON RESERVES USING TOOL RESPONSE MODELS

BACKGROUND

Embodiments described herein relate generally to downhole exploration and production efforts and more particularly to techniques for evaluating hydrocarbon reserves using tool response models.

Downhole exploration and production efforts involve the deployment of a variety of sensors and tools. The sensors provide information about the downhole environment, for example, by providing measurements of temperature, density, saturation, and resistivity, among many other parameters. This information can be used to control aspects of drilling and tools or systems located in the bottomhole assembly, along the drillstring, or on the surface.

SUMMARY

According to one embodiment of the present disclosure, a method for evaluating hydrocarbon reserves using tool response models is provided. The method includes measuring, by a processing resource, a first fluid distribution of a first formation proximate to a first wellbore. The method further includes measuring, by the processing resource, a second fluid distribution of a second formation proximate to a second wellbore. The method further includes generating, by the processing resource, a first tool response model for the first formation based at least in part on the first fluid distribution. The method further includes generating, by the processing resource, a second tool response model for the second formation based at least in part on the second fluid distribution. The method further includes comparing, by the processing resource, results of the first tool response model to results of the second tool response model to determine a fluid distribution difference between the first formation and the second formation. The method further includes implementing a drilling command to alter drilling of one of the first wellbore and the second wellbore based at least in part on the fluid distribution difference between the first formation and the second formation.

According to another embodiment of the present disclosure, a system for evaluating hydrocarbon reserves using tool response models is provided. The system includes a memory comprising computer readable instructions, and a processing device for executing the computer readable instructions for performing a method. The method includes generating, by the processing device, a first tool response model for a first formation proximate to a first wellbore based at least in part on a first fluid distribution of the first formation. The method further includes generating, by the processing device, a second tool response model for a second formation proximate to a second wellbore based at least in part on a second fluid distribution of the second formation. The method further includes comparing, by the processing device, results of the first tool response model to results of the second tool response model to determine a fluid distribution difference between the first formation and the second formation. The method further includes implementing a well construction action to complete at least one of one of the first wellbore and the second wellbore based at least in part on the fluid distribution difference between the first formation and the second formation.

BRIEF DESCRIPTION OF THE DRAWINGS

Referring now to the drawings wherein like elements are numbered alike in the several figures.

DETAILED DESCRIPTION

The present techniques relate evaluating hydrocarbon reserves using tool response models. In particular, the present techniques are directed to evaluating hydrocarbon reserves in a subsurface by measuring fluid distributions of formations around wellbores, generating tool response models (TRM) for each formation based on the measured fluid distributions, and comparing the tool response models to determine a fluid distribution difference that is used to modify drilling, perform well completion, etc. Accordingly, techniques for evaluating reservoir drainage efficiency between wellbores are provided. The evaluation results provide information for performing drilling operations and making well completion decisions.

TRM can be performed on two or more wellbores, and the TRM results can be compared to evaluate reserves and/or drainage behavior between the wellbores. TRM can be performed by forward and/or inverse algorithms to simulate an expected (synthetic) log response for a subsurface formation around each wellbore. The simulation is conducted until a synthetic log matches a true measurement so that the underlying digital model represents the true formation properties. In this respect, the present techniques enable evaluating drainage efficiency and reserves by comparing tool response modeling results (models) instead of, or in combination with, conventional data.

Figure 1:
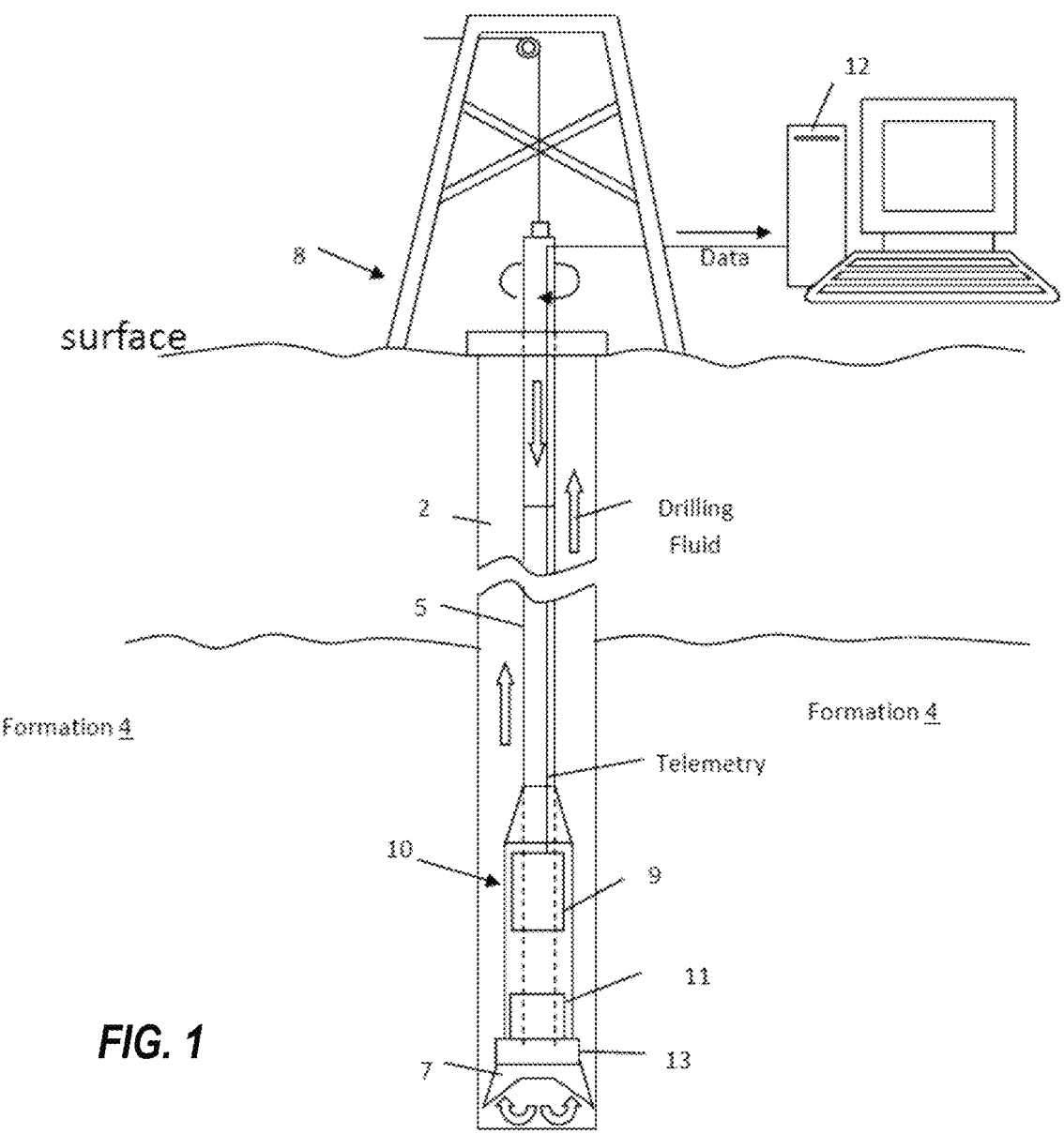
FIG. 1 depicts a cross-sectional view of a downhole system according to aspects of the present disclosure.

Wellbores are drilled into a subsurface to produce hydrocarbons and for other purposes. In particular, FIG. 1 depicts a cross-sectional view of a wellbore operation 100, according to aspects of the present disclosure. In traditional wellbore operations, logging-while-drilling (LWD) measurements are conducted during a drilling operation to determine formation rock and fluid properties of the formation 4. Those properties are then used to for various purposes such as estimating reserves from saturation logs, defining completion setups etc. as described herein.

Figure 2:
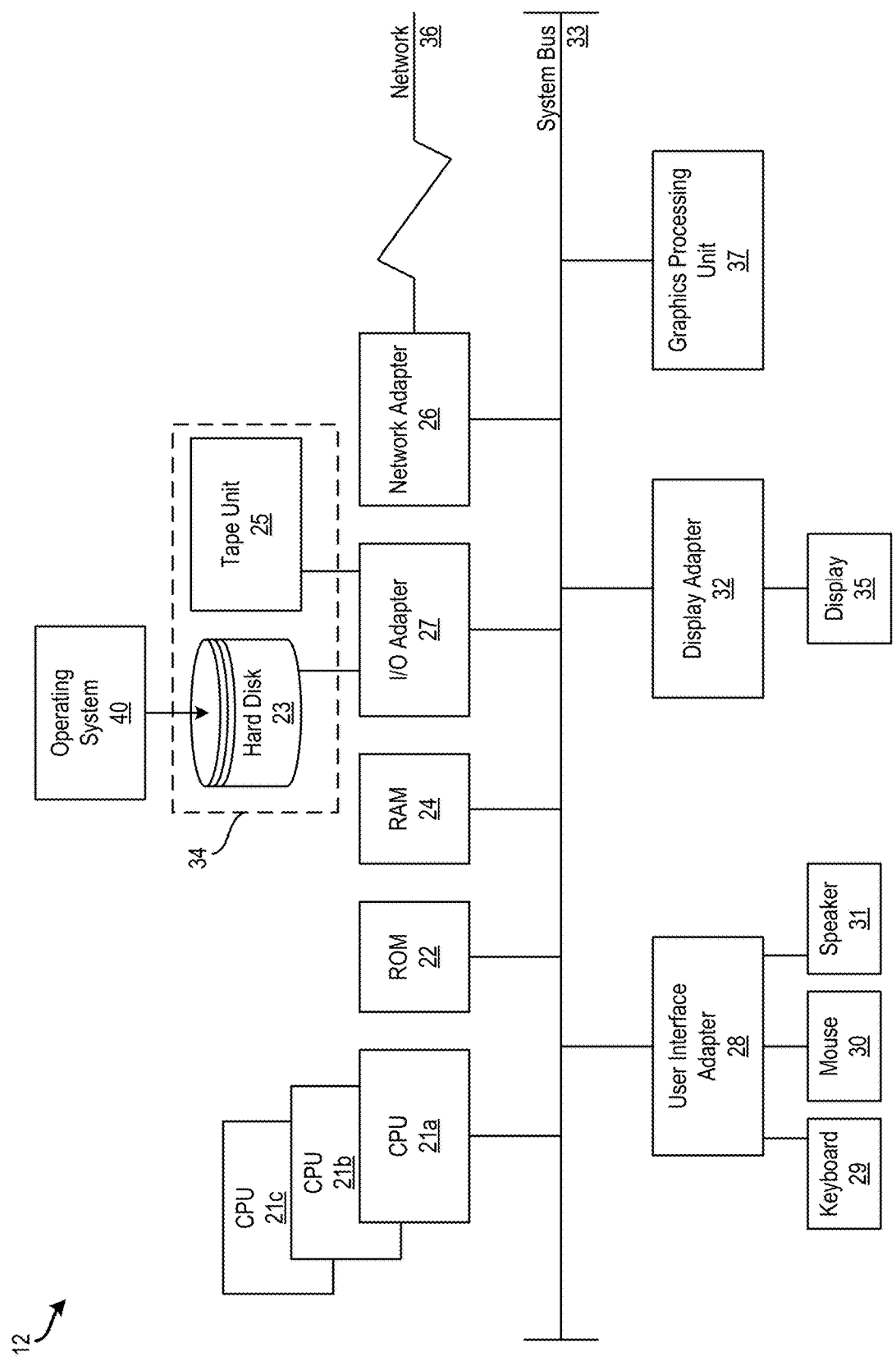
FIG. 2 depicts a block diagram of the processing system of FIG. 1, which can be used for implementing the techniques described herein according to aspects of the present disclosure.

The system and arrangement shown in FIG. 1 is one example to illustrate the downhole environment. While the system can operate in any subsurface environment, FIG. 1 shows downhole tools 10 disposed in a borehole 2 penetrating the formation 4. The downhole tools 10 are disposed in the borehole 2 at a distal end of a carrier 5, as shown in FIG. 1, or in communication with the borehole 2, as shown in FIG. 2. The downhole tools 10 can include measurement tools 11 and downhole electronics 9 configured to perform one or more types of measurements in an embodiment known as Logging-While-Drilling (LWD) or Measurement-While-Drilling (MWD).

According to the LWD/MWD embodiment, the carrier 5 is a drill string that includes a bottomhole assembly (BHA)

13. The BHA 13 is a part of the drilling rig 8 that includes drill collars, stabilizers, reamers, and the like, and the drill bit 7. The measurements can include measurements related to drill string operation, for example. A drilling rig 8 is configured to conduct drilling operations such as rotating the drill string and, thus, the drill bit 7. The drilling rig 8 also pumps drilling fluid through the drill string in order to lubricate the drill bit 7 and flush cuttings from the borehole 2.

Raw data and/or information processed by the downhole electronics 9 can be telemetered to the surface for additional processing or display by a processing system 12. Drilling control signals can be generated by the processing system 12 and conveyed downhole or can be generated within the downhole electronics 9 or by a combination of the two according to embodiments of the present disclosure. The downhole electronics 9 and the processing system 12 can each include one or more processors and one or more memory devices. In alternate embodiments, computing resources such as the downhole electronics 9, sensors, and other tools can be located along the carrier 5 rather than being located in the BHA 13, for example. The borehole 2 can be vertical as shown or can be in other orientations/arrangements.

It is understood that embodiments of the present disclosure are capable of being implemented in conjunction with any other suitable type of computing environment now known or later developed. For example, FIG. 2 depicts a block diagram of the processing system 12 of FIG. 1, which can be used for implementing the techniques described herein. In examples, processing system 12 has one or more central processing units (processors) 21a, 21b, 21c, etc. (collectively or generically referred to as processor(s) 21 and/or as processing device(s)). In aspects of the present disclosure, each processor 21 can include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and can include a basic input/output system (BIOS), which controls certain basic functions of processing system 12.

Further illustrated are an input/output (I/O) adapter 27 and a communications adapter 26 coupled to system bus 33. I/O adapter 27 can be a small computer system interface (SCSI) adapter that communicates with a hard disk 23 and/or a tape storage drive 25 or any other similar component. I/O adapter 27, hard disk 23, and tape storage device 25 are collectively referred to herein as mass storage 34. Operating system 40 for execution on processing system 12 can be stored in mass storage 34. A network adapter 26 interconnects system bus 33 with an outside network 36 enabling processing system 12 to communicate with other such systems.

A display (e.g., a display monitor) 35 is connected to system bus 33 by display adaptor 32, which can include a graphics adapter to improve the performance of graphics intensive applications and a video controller. In one aspect of the present disclosure, adapters 26, 27, and/or 32 can be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 can be interconnected to system bus 33 via user interface adapter 28, which can include, for example, a Super I/O chip integrating multiple device adapters into a single integrated circuit.

In some aspects of the present disclosure, processing system 12 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing and has a highly parallel structure that makes it more effective than general-purpose CPUs for algorithms where processing of large blocks of data is done in parallel.

Thus, as configured herein, processing system 12 includes processing capability in the form of processors 21, storage capability including system memory (e.g., RAM 24), and mass storage 34, input means such as keyboard 29 and mouse 30, and output capability including speaker 31 and display 35. In some aspects of the present disclosure, a portion of system memory (e.g., RAM 24) and mass storage 34 collectively store an operating system to coordinate the functions of the various components shown in processing system 12.

Figure 3:
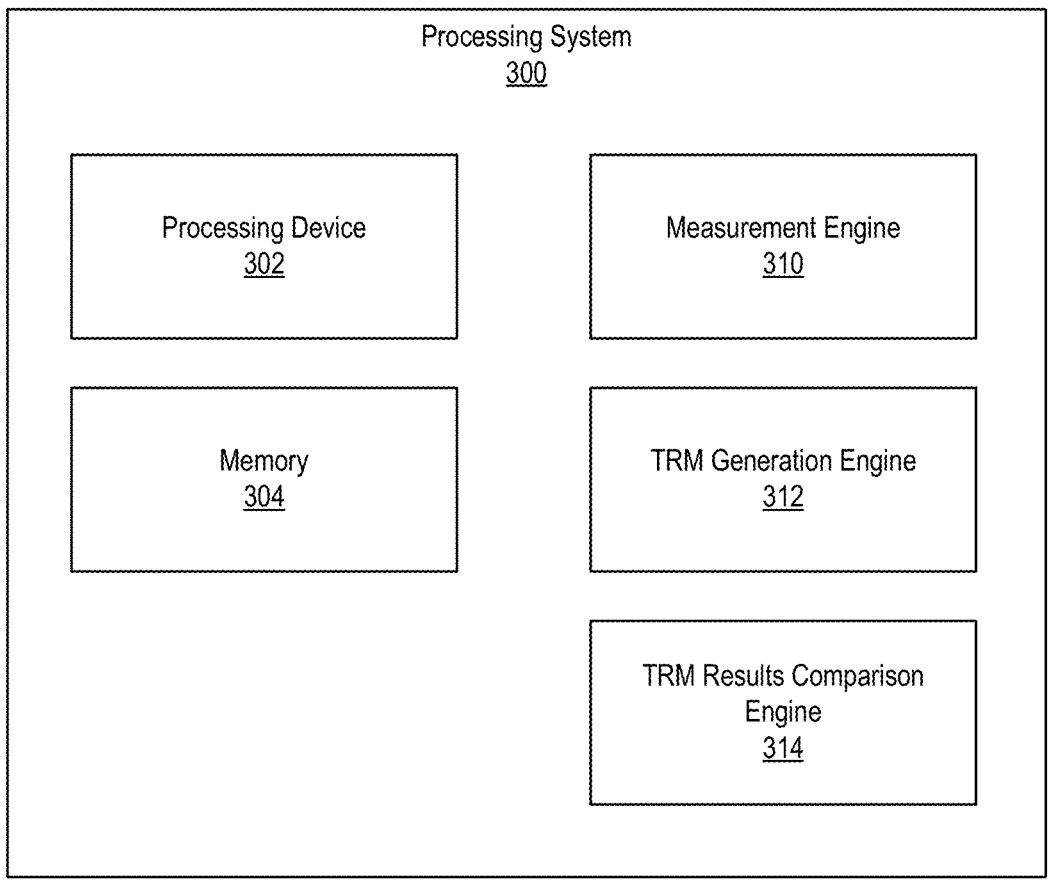
FIG. 3 depicts a block diagram of a processing system for evaluating hydrocarbon reserves using tool response models according to aspects of the present disclosure.

FIG. 3 depicts a block diagram of a processing system 300 for evaluating hydrocarbon reserves using tool response models according to aspects of the present disclosure. The processing system 300 includes a processing device 302, a memory 304, a measurement engine 310, a TRM generation engine 312, and a TRM results comparison engine 314.

The various components, modules, engines, etc. described regarding FIG. 3 can be implemented as instructions stored on a computer-readable storage medium, as hardware modules, as special-purpose hardware (e.g., application specific hardware, application specific integrated circuits (ASICs), application specific special processors (ASSPs), field programmable gate arrays (FPGAs), as embedded controllers, hardwired circuitry, etc.), or as some combination or combinations of these. According to aspects of the present disclosure, the engine(s) described herein can be a combination of hardware and programming. The programming can be processor executable instructions stored on a tangible memory, and the hardware can include the processing device 302 for executing those instructions. Thus a system memory (e.g., the memory 304) can store program instructions that when executed by the processing device 302 implement the engines described herein. Other engines can also be utilized to include other features and functionality described in other examples herein.

The measurement engine 310 measures a first fluid distribution of a first formation proximate (e.g., a formation around a wellbore, a formation near a wellbore, etc.) to a first wellbore and measures a second fluid distribution of a second formation proximate to a second wellbore. In some examples, the measurement engine 310 measures the fluid distributions of the wellbores using the measurement tools 11. The measurements are taken within the wellbores to perform tool response modeling and are indicative of fluid distribution of the formation around each of the respective wellbores. The measurements can be taken during LWD, by wireline equipment, or by surface gas logging equipment. The measurements can be derived from a saturation log, and the saturation can be derived from a formation evaluation log, which can be one or more of resistivity, conductivity, magnetic resonance, neutron, density, acoustic, spontaneously potential, mud gas data, dielectric, and/or the like or suitable combinations thereof.

Saturation logs can be derived from a resistivity log and a porosity log using Archie's equation. A resistivity log can be one of an induction-type, a laterolog, or others, and a porosity can be measured using a magnetic resonance, a neutron, a density or an acoustic log or a combination of the above. Saturation estimates can also be conducted from a dielectric log. An alternative way of deriving the saturation is to use gas analysis equipment at the surface or in a downhole tool (e.g., the downhole tools 10) to measure the gas composition of the drilling mud as an indicator of the fluid composition of fluid contained downhole in a reservoir rock.

In addition to deriving the saturation of water and hydrocarbons in a formation, the volume of hydrocarbons contained in a porous rock can be calculated by the multiplication of water saturation times total or effective porosity (for water volume) and multiplication of hydrocarbon saturation times total or effective porosity (for hydrocarbon fluid volume). Whereas the saturation provides information about the percentage of different fluid types contained in the pore space of the rock, the volume provides a measure of the amount of total hydrocarbon contained in a volume of rock.

In cases where such measurements are available for multiple wellbores, a comparison of formation rock and/or fluid properties can be conducted to evaluate the drainage behavior between wellbores by the TRM results comparison engine 314. For example, two saturation or hydrocarbon volume logs provide information about the fluid distributions around the wellbores and can thus be compared with each other to identify if and by what extent the fluid content between two boreholes is changing. Such a comparison can be conducted between two producers or injectors or between a producer and injector to identify the drainage effect of injection into a subsurface.

One possibility of comparing two water saturations is given by a saturation ratio log. Water saturation is typically derived by equations such as the Archie equation:

$$S_w = \sqrt[n]{\frac{R_w}{\varphi^m R_t}}$$

where $S_w$ represents the water saturation, $R_w$ represents the resistivity of the water-bearing formation, $R_t$ represents the true formation resistivity, $\varphi$ represents the porosity, and m and n represent the cementation and saturation exponents, respectively. Whenever exponents or input parameters other than the formation resistivity are unknown, a water saturation ratio $S_{wr}$ can be obtained using the following equation:

$$S_{wr} = \frac{S_w^1}{S_w^2} = \sqrt[n]{\frac{R_t^2}{R_t^1}}$$

where $S_w^1$ represents the water saturation from one resistivity log or model, and $S_w^2$ represents the saturation from another resistivity log or model. The saturation ratio thus describes, without knowledge of many input parameters, how water (and consequently hydrocarbon) saturations compare from different resistivity logs or models and therefore how saturations differ between different wellbores.

According to aspects of the present disclosure, a saturation log can be derived by measuring gas composition using equipment installed at the surface of the drilling rig 8. When the formation 4 is crushed by the drill bit 7, the fluids contained in rocks in the formation 4 are released and transported to surface by drilling fluid. Surface-based equipment can then extract gas from the drilling fluid when it reaches the surface. The surface-based equipment records the concentrations of the analyzed gases. After correction for dilution effects has been applied, these measurements can be used to estimate the porosity and fluid saturation of hydrocarbon filled formations. For balanced to over-balanced drilling, this measurement reflects only the drilled rock volume and is therefore representative for small-scale changes in front and around the drill bit 7, resulting in a saturation estimation for the drilled volume.

One challenge with using LWD logs for saturation estimates as described is the uncertainty of the measurements associated with the environment in which the logs were acquired. For example, environmental corrections for borehole size, invaded mud, temperature, salinity etc. may be applied prior to using the logs for saturation estimates. In inclined boreholes (e.g., horizontal boreholes), the logs can also be sensitive to the geometric arrangement between the borehole and subsurface formations. If such formations are logged at a high angle between the formation boundaries and a plane perpendicular to the wellbore, the measurements are sensitive to the formation properties within the depth of investigation of the measurements. The acquired log thus represents an apparent formation property instead of a true formation property of the formation at the wellbore, and corrections may be applied to correct for those geometric artifacts.

Additional artifacts on the LWD logs originate from the borehole environment in which an LWD measurement is undertaken. Such environmental effects include, but are not limited to, invasion of drilling mud into the formation, borehole enlargements, temperature differences between the virgin formation fluid and the fluid within the sensitive volume of LWD sensor reading, LWD logging tool eccentricity etc. Whereas such effects are reasonably well understood for wireline logging applications in vertical wells with simplified borehole geometries, such effects become complicated in highly inclined wells. Digital tool response models can thus also be used to simulate the influence of environmental effects on the LWD logs and to derive a true formation model without those environmental effects. The present disclosure corrects for geometric and/or environmental artifacts by generating tool response models using the TRM generation engine 312. This approach can be particularly useful when logging measurements are sensitive to formation properties of multiple layers so that the resulting log represents an apparent formation property instead of a true formation property. TRM can be conducted by forward and/or inversion algorithms and aims at simulating the expected (synthetic) log response based on a digital model of a subsurface formation (e.g., the formation 4) surrounding or proximate to the measurement. The simulation performed by the TRM generation engine 312 is conducted until a synthetic log matches a true measurement so that the underlying digital model represents the true formation properties.

Tool response modeling is an approach to derive a subsurface model with true formation properties which explain a measured log response. Therefore, logs are not corrected but instead used to derive the formation model. As used herein, reference to log correction can occur by using any type of modeling, creating and using a model, environmental corrections for mud invasion, salinity, etc.

A comparison of fluid distributions between at least two wellbores can conducted during a drilling operation based on measurements conducted by logging-while-drilling tools.

The comparison performed by the TRM results comparison engine 314 is conducted between the actively drilled well and an historical well to evaluate the drainage behavior of the formation in between these wellbores. This information can then be used in real time to stay within a zone with a larger hydrocarbon saturation. In some examples, a difference in saturations between adjacent wellbores can be affected by the historical production of a reservoir. The comparison of saturations between an actively drilled wellbore and a historical wellbore can, therefore, consider an expected change in water saturation and/or hydrocarbon saturation in the time between these two wellbores before conclusions about the reservoir drainage behavior can be conducted.

An alternative scenario can include the likewise drilling of two wellbores from different drilling platforms. In that scenario, TRM based on measurements at more or less the same acquisition time can be conducted and a comparison in hydrocarbon saturation can be conducted even without considering the effect of production and/or injection history on the saturations.

Another alternative scenario could be a devised, simulated, or modeled reference well that can then be used as a field wide reference.

A difference between water saturations can also originate from a change in saturation with changes in depth. For example, a transition zone may exist between two fluid types (e.g., oil, gas, water, etc.) in which the saturation between two fluids and/or the fluid composition are gradually changing. A varying change in hydrocarbon saturation with depth occurs, for example, as an effect of gravitational separation between lighter and heavier hydrocarbon compounds. The comparison of saturations can, therefore, be conducted after the saturations are transferred to the same vertical depth or another reference point at which the saturations are expected to be approximately equal. Different analytical approaches (e.g. NMR, mud gas logging, etc.) may be needed for low resistivity pay zones where the resistivity of rock of a formation complicates the determination of water saturation and/or hydrocarbon saturation from resistivity logs.

According to aspects of the present disclosure, the expected change in saturation can be derived from a reservoir simulation model. The model can predict an expected production out of at least one wellbore drilled into a subsurface formation so that also the drainage behavior of a formation between two wellbores over time can be derived. The model thus provides for determining an expected water saturation and/or hydrocarbon saturation for a planned wellbore, which can then be compared against the saturation derived from the measurement.

Additionally, a completion string can then be designed and implemented depending on the results of the drainage behavior. For example, inflow control devices (ICD's) are positioned to control the production of the actively drilled well for the optimization of the reservoir drainage. The evaluation of the drainage behavior additionally aids an operator of a wellbore operation to evaluate hydrocarbon reserves and position new production/injection wells.

In another example, the TRM results comparison engine 314 can compare fluid distributions between two wellbores by comparing T2 distributions acquired by a magnetic resonance (e.g., a nuclear magnetic resonance) measurement.

Figure 4:
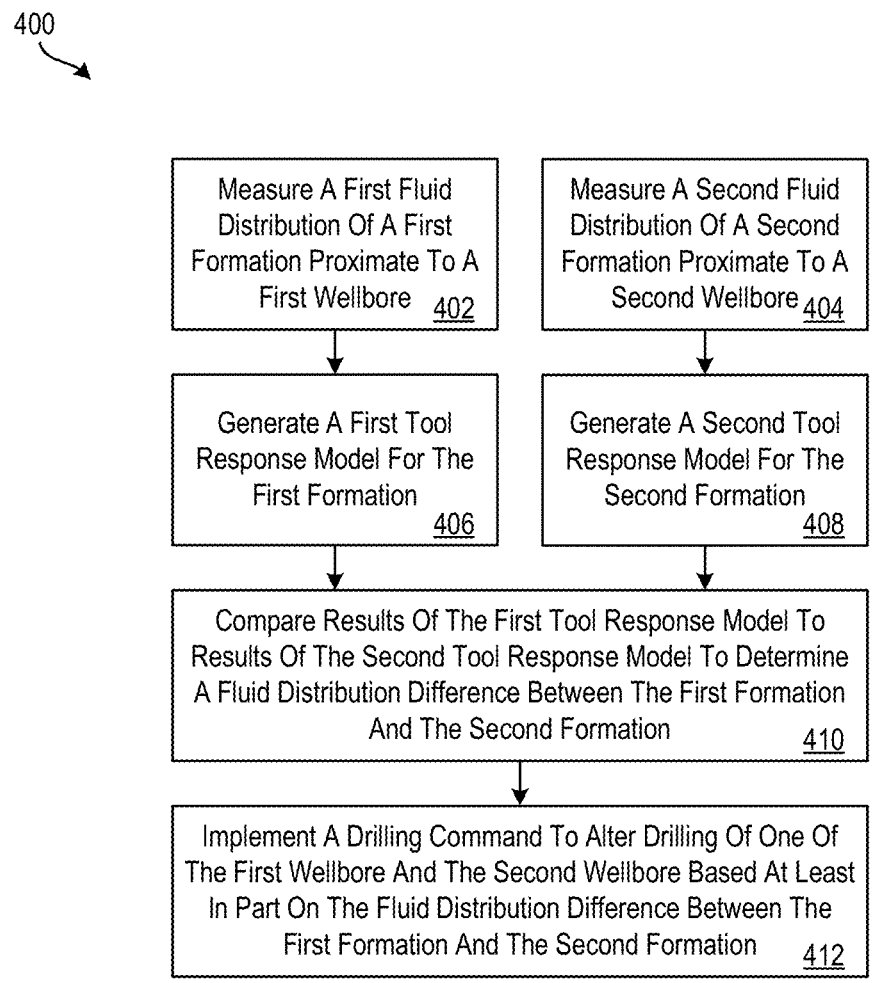
FIG. 4 depicts a flow diagram of a method for evaluating hydrocarbon reserves using tool response models according to aspects of the present disclosure.

FIG. 4 depicts a flow diagram of a method 400 for evaluating hydrocarbon reserves using tool response models according to aspects of the present disclosure. The method 400 can be implemented by any suitable processing system, such as the processing system 12 of FIGS. 1 and 2 or the processing system 300 of FIG. 3. In another example, the method 400 can be implemented by a processing device, such as the processor 21 of the processing system 12.

At block 402, the measurement engine 310 measures a first fluid distribution of a first formation proximate to a first wellbore. At block 404 the measurement engine 310 measures a second fluid distribution of a second formation proximate to a second wellbore. The measurements are taken within the wellbores to perform tool response modeling and are indicative of fluid distribution of the formation around each of the respective wellbores. The measurements can be taken during LWD, by wireline equipment, or by surface gas logging equipment. The measurements can be derived from a saturation log, and the saturation can be derived from a formation evaluation log, which can be one or more of resistivity, conductivity, magnetic resonance, neutron, density, acoustic, spontaneously potential, mud gas data, dielectric, and/or the like or suitable combinations thereof. It should be appreciated that the blocks 402 and 404 can be performed sequentially, concurrently, simultaneously, or as is otherwise suitable.

At block 406, the TRM generation engine 312 generates a first tool response model for the first formation based at least in part on the first fluid distribution. At block 408, the TRM generation engine generates a second tool response model for the second formation based at least in part on the second fluid distribution.

At block 410, the TRM results comparison engine 314 compares results of the first tool response model to results of the second tool response model to determine a fluid distribution difference between the first formation and the second formation. The fluid distribution difference represents a difference in water saturation and/or oil saturation between the first formation and the second formation. The fluid distribution difference can be expressed as a saturation ratio, for example, as described above. In particular, comparing the results of the TRMs can include comparing formation rock and/or fluid properties to evaluate reserves and/or drainage behavior in formations in proximity to the wellbores. For example, two saturations can be compared to identify how fluid content is changing between the two boreholes. A saturation ratio, derived by the Archie equation, can be used as described herein.

Figure 5:
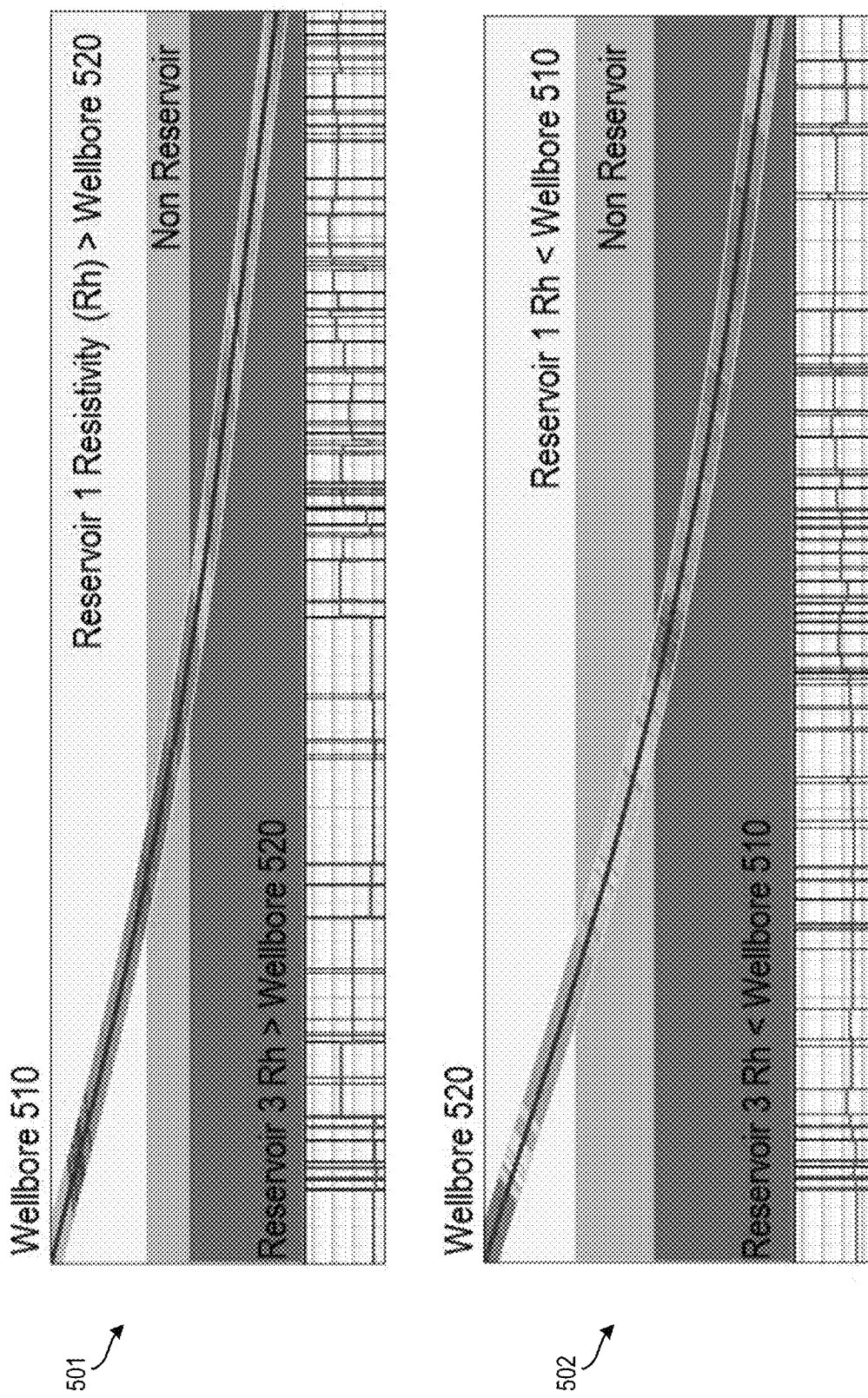
FIG. 5 depicts graphs of results of a tool response model for two wellbores, according to aspects of the present disclosure.

FIG. 5 depicts graphs 501, 502 of TRM results for two wellbores 510, 520 respectively, according to aspects of the present disclosure. In the example of FIG. 5, the TRM generation engine 312 generates tool response models for the wellbores 510, 520 based on resistivity. Each of the wellbores 510, 520 have different reservoirs. As shown in FIG. 5, the TRMs for the resistivity of the wellbores 510, 512 can be compared. In this example, the resistivity (Rh) of the first region of the wellbore 510 is greater than the resistivity of the first region of the wellbore 520. Similarly, the resistivity of the third region of the wellbore 510 is greater than the resistivity of the third region of the wellbore 520. This information can be used to implement a well construction action (e.g., determining whether and how to complete the well), to perform a drilling, action, etc.

For example, with continued reference to FIG. 4, the comparison between the results of the TRMs of the two or more wellbores can be used to evaluate reservoir drainage efficiency between wellbores to provide information for drilling and/or completion decisions. For example, at block 412, the method 400 includes implementing a drilling command to alter drilling of one of the first wellbore and the second wellbore based at least in part on the fluid distribution difference between the first formation and the second formation.

According to aspects of the present disclosure, the drilling command is a drilling control signal that can be used to operate the drilling rig 8 and/or the drill bit 7 as described with reference to FIG. 1. In another example, the comparison between the results of the TRMs of the wellbores can be used to make completion decisions to decide whether to transform a drilled well into a producing well by performing, for example, casing, cementing, perforating, gravel packing, etc. For example, the method 400 can include implementing a well construction action to complete at least one of one of the first wellbore and the second wellbore based at least in part on the fluid distribution difference between the first formation and the second formation.

Additional processes also can be included, and it should be understood that the processes depicted in FIG. 4 represent illustrations and that other processes can be added or existing processes can be removed, modified, or rearranged without departing from the scope and spirit of the present disclosure.

As described herein, the method 400 can also be performed by a processing resource, which can include one or more processing devices. For example, a processing resource can include a first processing device located at or near the first wellbore and a second processing device located at or near a second wellbore. Accordingly, the first processing device measures the first fluid distribution of the first formation and the second processing device measures the second fluid distribution of the second formation. Either or both of the first and second processing devices, or an additional processing device (e.g., located at or near one of the wellbores, located at another facility, located in a cloud computing environment, etc.), can generate the first and second tool response models and compare the results of the tool response models. These and other configurations are possible. For example, each step of the method 400 can be performed by the same processing device, by a different processing device, or by combinations of processing devices.

Example embodiments of the disclosure include or yield various technical features, technical effects, and/or improvements to technology. Example embodiments of the disclosure provide techniques for evaluating hydrocarbon reserves using tool response models by generating tool response models for formations and comparing the tool response models to determine a fluid distribution difference between the formations so that a wellbore drilling and/or wellbore completion can occur. These aspects of the disclosure constitute technical features that yield the technical effect of evaluating reservoir drainage efficiency between wellbores so the wellbores can be more efficiently drilled, so hydrocarbons can be more efficiently extracted, etc. As a result of these technical features and technical effects, techniques in accordance with example embodiments of the disclosure represents an improvement to existing reservoir evaluation techniques. It should be appreciated that the above examples of technical features, technical effects, and improvements to technology of example embodiments of the disclosure are merely illustrative and not exhaustive.

Set forth below are some embodiments of the foregoing disclosure:

Embodiment 1

A method for evaluating hydrocarbon reserves using tool response models, the method comprising: measuring, by a processing resource, a first fluid distribution of a first formation proximate to a first wellbore; measuring, by the processing resource, a second fluid distribution of a second formation proximate to a second wellbore; generating, by the processing resource, a first tool response model for the first formation based at least in part on the first fluid distribution; generating, by the processing resource, a second tool response model for the second formation based at least in part on the second fluid distribution; comparing, by the processing resource, results of the first tool response model to results of the second tool response model to determine a fluid distribution difference between the first formation and the second formation; and implementing a drilling command to alter drilling of one of the first wellbore and the second wellbore based at least in part on the fluid distribution difference between the first formation and the second formation.

Embodiment 2

A method according to any prior embodiment, wherein at least one of the first fluid distribution and the second fluid distribution is measured during logging-while-drilling.

Embodiment 3

A method according to any prior embodiment, wherein at least one of the first fluid distribution and the second fluid distribution is measured by wireline equipment.

Embodiment 4

A method according to any prior embodiment, wherein at least one of the first fluid distribution and the second fluid distribution is measured using surface-based gas logging equipment.

Embodiment 5

A method according to any prior embodiment, wherein at least one of the first fluid distribution and the second fluid distribution is derived from a saturation or hydrocarbon volume.

Embodiment 6

A method according to any prior embodiment, wherein the saturation is derived from a formation evaluation.

Embodiment 7

A method according to any prior embodiment, wherein the formation evaluation is based on at least one of the following: resistivity data, conductivity data, magnetic resonance data, neutron density data, acoustic data, spontaneous potential data, mud gas data, and dielectric data.

Embodiment 8

A method according to any prior embodiment, wherein comparing the results of the first tool response model to the results of the second tool response model comprises comparing a first saturation for the first tool response model to a second saturation for the second tool response model.

Embodiment 9

A method according to any prior embodiment, wherein comparing the first saturation to the second saturation comprises determining a saturation ratio.

Embodiment 10

A method according to any prior embodiment, wherein the saturation ratio is obtained using the following equation $$S_{wr} = \frac{S_w^1}{S_w^2} = \sqrt[n]{\frac{R_t^2}{R_t^1}}$$

where $S_w^1$ represents a saturation the first tool response model, and $S_w^2$ represents the saturation from the second tool response model.

Embodiment 11

A method according to any prior embodiment, further comprising implementing a well construction action to complete at least one of one of the first wellbore and the second wellbore based at least in part on the fluid distribution difference between the first formation and the second formation.

Embodiment 12

A system for evaluating hydrocarbon reserves using tool response models, the system comprising: a memory comprising computer readable instructions; and a processing device for executing the computer readable instructions for performing a method, the method comprising: generating, by the processing device, a first tool response model for a first formation proximate to a first wellbore based at least in part on a first fluid distribution of the first formation; generating, by the processing device, a second tool response model for a second formation proximate to a second wellbore based at least in part on a second fluid distribution of the second formation; comparing, by the processing device, results of the first tool response model to results of the second tool response model to determine a fluid distribution difference between the first formation and the second formation; and implementing a well construction action to complete at least one of one of the first wellbore and the second wellbore based at least in part on the fluid distribution difference between the first formation and the second formation.

Embodiment 13

A system according to any prior embodiment, further comprising: prior to generating the first tool response model, measuring the first fluid distribution of the first formation proximate to the first wellbore; and prior to generating the second tool response model, measuring the second fluid distribution of the second formation proximate to the second wellbore.

Embodiment 14

A system according to any prior embodiment, wherein at least one of the first fluid distribution and the second fluid distribution is measured during logging-while-drilling.

The use of the terms "a" and "an" and "the" and similar referents in the context of describing the present disclosure (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The teachings of the present disclosure can be used in a variety of well operations. These operations can involve using one or more treatment agents to treat a formation, the fluids resident in a formation, a wellbore, and/or equipment in the wellbore, such as production tubing. The treatment agents can be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the present disclosure has been described with reference to an exemplary embodiment or embodiments, it will be understood by those skilled in the art that various changes can be made and equivalents can be substituted for elements thereof without departing from the scope of the present disclosure. In addition, many modifications can be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims. Also, in the drawings and the description, there have been disclosed exemplary embodiments of the present disclosure and, although specific terms can have been employed, they are unless otherwise stated used in a generic and descriptive sense only and not for purposes of limitation, the scope of the present disclosure therefore not being so limited.

What is claimed is:

1. A method for evaluating hydrocarbon reserves using tool response models, the method comprising:
    measuring, by a processing resource, a first fluid distribution of a first formation proximate to a first wellbore;
    measuring, by the processing resource, a second fluid distribution of a second formation proximate to a second wellbore;
    generating, by the processing resource, a first tool response model for the first formation based at least in part on the first fluid distribution;
    generating, by the processing resource, a second tool response model for the second formation based at least in part on the second fluid distribution;
    comparing, by the processing resource, results of the first tool response model to results of the second tool response model to determine a fluid distribution difference between the first formation and the second formation, wherein comparing the results of the first tool response model to the results of the second tool response model comprises comparing a first saturation for the first tool response model to a second saturation for the second tool response model and wherein comparing the first saturation to the second saturation comprises determining a saturation ratio; and implementing a drilling command to alter drilling of one of the first wellbore and the second wellbore based at least in part on the fluid distribution difference between the first formation and the second formation.

2. The method of claim 1, wherein at least one of the first fluid distribution and the second fluid distribution is measured during logging-while-drilling.

3. The method of claim 1, wherein at least one of the first fluid distribution and the second fluid distribution is measured by wireline equipment.

4. The method of claim 1, wherein at least one of the first fluid distribution and the second fluid distribution is measured using surface-based gas logging equipment.

5. The method of claim 1, wherein at least one of the first fluid distribution and the second fluid distribution is derived from a saturation or hydrocarbon volume.

6. The method of claim 5, wherein the saturation is derived from a formation evaluation.

7. The method of claim 6, wherein the formation evaluation is based on at least one of the following: resistivity data, conductivity data, magnetic resonance data, neutron density data, acoustic data, spontaneous potential data, mud gas data, and dielectric data.

8. The method of claim 1, wherein the saturation ratio is obtained using the following equation $$S_{wr} = \frac{S_w^1}{S_w^2} = \sqrt[n]{\frac{R_t^2}{R_t^1}}$$

where $S_w^1$ represents a saturation from the first tool response model, $S_w^1$ represents the saturation from the second tool response model, $R_t^1$ represents a true formation resistivity of the first formation, $R_t^2$ represents the true formation resistivity of the second formation, and n represents a saturation exponent.

9. The method of claim 1, further comprising implementing a well construction action to complete at least one of one of the first wellbore and the second wellbore based at least in part on the fluid distribution difference between the first formation and the second formation.

10. A system for evaluating hydrocarbon reserves using tool response models, the system comprising:

a memory comprising computer readable instructions; and a processing device for executing the computer readable instructions for performing a method, the method comprising:

generating, by the processing device, a first tool response model for a first formation proximate to a first wellbore based at least in part on a first fluid distribution of the first formation;

generating, by the processing device, a second tool response model for a second formation proximate to a second wellbore based at least in part on a second fluid distribution of the second formation;

comparing, by the processing device, results of the first tool response model to results of the second tool response model to determine a fluid distribution difference between the first formation and the second formation, wherein comparing the results of the first tool response model to the results of the second tool response model comprises comparing a first saturation for the first tool response model to a second saturation for the second tool response model and wherein comparing the first saturation to the second saturation comprises determining a saturation ratio; and implementing a drilling command to alter drilling of at least one of one of the first wellbore and the second wellbore based at least in part on the fluid distribution difference between the first formation and the second formation.

11. The system of claim 10, further comprising:

prior to generating the first tool response model, measuring the first fluid distribution of the first formation proximate to the first wellbore; and prior to generating the second tool response model, measuring the second fluid distribution of the second formation proximate to the second wellbore.

12. The system of claim 11, wherein at least one of the first fluid distribution and the second fluid distribution is measured during logging-while-drilling.

* * * * *